US011711212B2

(12) United States Patent
Yeo et al.

(10) Patent No.: US 11,711,212 B2
(45) Date of Patent: Jul. 25, 2023

(54) POST-QUANTUM SECURE KEY-ROTATION FOR STORAGE DEVICES

(71) Applicant: Seagate Technology LLC, Fremont, CA (US)

(72) Inventors: Foo Yee Yeo, Singapore (SG); Saravanan Nagarajan, Singapore (SG); Vipin Singh Sehrawat, Singapore (SG); Kian Beng Lim, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 200 days.

(21) Appl. No.: 17/177,780

(22) Filed: Feb. 17, 2021

(65) Prior Publication Data
US 2022/0263654 A1   Aug. 18, 2022

(51) Int. Cl.
*H04L 9/08* (2006.01)
*H04L 9/06* (2006.01)
*H04L 9/32* (2006.01)

(52) U.S. Cl.
CPC .......... *H04L 9/0891* (2013.01); *H04L 9/0618* (2013.01); *H04L 9/0894* (2013.01); *H04L 9/3213* (2013.01)

(58) Field of Classification Search
CPC ... H04L 9/0891; H04L 9/0618; H04L 9/0894; H04L 9/3213
USPC .......................................................... 380/28
See application file for complete search history.

(56) References Cited

U.S. PATENT DOCUMENTS

| 5,907,620 A | 5/1999 | Klemba et al. |
| 7,770,227 B2 | 8/2010 | Wada |
| 2006/0117013 A1* | 6/2006 | Wada ............... G06F 21/10 707/999.009 |
| 2012/0008768 A1 | 1/2012 | Mundra et al. |

(Continued)

FOREIGN PATENT DOCUMENTS

| JP | H1093551 A | 4/1998 |
| JP | 2006178930 A | 7/2006 |
| JP | 2009182897 A | 8/2009 |

(Continued)

OTHER PUBLICATIONS

Boneh, D., Eskandarian, S., Kim, S., Shih, M. (Dec. 5, 2020). Improving Speed and Security in Updatable Encryption Schemes. In: Moriai, S., Wang, H. (eds) Advances in Cryptology— ASIACRYPT 2020. ASIACRYPT 2020. Lecture Notes in Computer Science( ), vol. 12493. (Year: 2020).*

(Continued)

*Primary Examiner* — Kambiz Zand
*Assistant Examiner* — Phuc Pham
(74) *Attorney, Agent, or Firm* — Westman, Champlin & Koehler, P.A.

(57) ABSTRACT

A method includes receiving, in a data storage device, a request from a client computer for a portion of ciphertext stored in the data storage device, and providing, by a controller of the data storage device, the portion of the ciphertext to the client computer. The method also includes receiving, in the data storage device, an update token generated by the client computer from the portion of the ciphertext. The method further includes performing, by the controller of the data storage device, re-encryption of the ciphertext using the update token.

14 Claims, 3 Drawing Sheets

(56) References Cited

U.S. PATENT DOCUMENTS

2016/0127125 A1* 5/2016 Yagisawa .............. H04L 9/14
380/28

FOREIGN PATENT DOCUMENTS

| JP | 2016032539 A | 3/2016 |
|---|---|---|
| KR | 101760376 B1 | 7/2017 |
| KR | 20180003106 A | 1/2018 |

OTHER PUBLICATIONS

Boneh, D., Lewi, K., Montgomery, H., Raghunathan, A. (2013). Key Homomorphic PRFs and Their Applications. In: Canetti, R., Garay, J.A. (eds) Advances in Cryptology—CRYPTO 2013. CRYPTO 2013. Lecture Notes in Computer Science, vol. 8042. Springer, Berlin.*

Boneh et al., "Key homomorphic PRFs and their applications", Feb. 2, 2014, In: CRYPTO, 2013, 41 pages.

Boneh et al., "Improving speed and security in updatable encryption schemes", In: IACR Cryptology ePrint Arch. 2020:222 (2020), 65 pages.

Boyd et al., "Fast and Secure Updatable Encryption", Jul. 29, 2020, © IACR 2020: An extended abstract of this paper appears in the proceedings of IACR CRYPTO 2020, with DOI:10.1007/978-3-030-56784-2_16, 59 pages.

Lehmann et al., "Updatable Encryption with Post-Compromise Security", Powerpoint, Found Online: Dec. 29, 2020, 24 pages.

(R)CCA Secure Updatable Encryption with Integrity Protection.—Michael Klooß, Anja Lehmann and Andy Rupp. First Online: Apr. 18, 2019, https://link.springer.com/chapter/10.1007/978-3-030-17653-2_3.

Boneh et al., "Improving Speed and Security in Updatable Encryption Systems", Powerpoint, 97 pages, In: IACR Cryptology ePrint Arch. 2020: 222 (2020).

* cited by examiner

POST-QUANTUM SECURE KEY-ROTATION FOR STORAGE DEVICES

SUMMARY

In one embodiment, a method is provided. The method includes receiving, in a data storage device, a request from a client computer for a portion of ciphertext stored in the data storage device, and providing, by a controller of the data storage device, the portion of the ciphertext to the client computer. The method also includes receiving, in the data storage device, an update token generated by the client computer from the portion of the ciphertext. The method further includes performing, by the controller of the data storage device, re-encryption of the ciphertext using the update token.

In another embodiment, a data storage device is provided. The data storage device includes at least one memory. The data storage device also includes a controller communicatively coupled to the at least one memory. The controller is configured to carry out encryption-related operations when new data is to be written in the data storage device. The encryption-related operations include determining whether a previously-generated ciphertext header is stored in the at least one memory. In response to determining that the previously-generated ciphertext header is stored in the at least one memory, the previously-generated ciphertext header is sent to a client computer for utilization in encryption of the new data. In response to determining that no previously-generated ciphertext header is stored in the at least one memory, a request is sent to the client computer to generate a new ciphertext header and a new ciphertext body for the new data.

In yet another embodiment, a computer-readable medium storing executable instructions is provided. The executable instructions, when executed by a processor, cause the processor to receive a request from a client computer for a portion of ciphertext stored in the data storage device, and provide the portion of the ciphertext to the client computer. The executable instructions also cause the processor to receive an update token generated by the client computer from the portion of the ciphertext, and re-encrypt the ciphertext using the update token.

This summary is not intended to describe each disclosed embodiment or every implementation of post-quantum secure key-rotation for storage devices as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure employ an updatable encryption scheme to achieve secure encryption key rotation in a data storage device.

The updatable encryption scheme allows rotations of the encryption key, which involves moving existing ciphertexts from old to new keys. These updates are carried out via update tokens, which can be used by an untrusted party since the update procedure does not involve decryption of the ciphertext. Updatable encryption ensures that an adversary who has compromised the old key cannot access the data after key rotation.

In embodiments of the disclosure, encryption and decryption of the data is performed by a client instead of the storage device. To enable encryption, a user of a client computer simply generates a key k and uses it to encrypt the data using an updatable encryption scheme before sending it to the data storage device.

The process of key rotation, however, does not involve much work on the part of the client, but is mostly offloaded to the data storage drive. To perform a key update, the user retrieves a small part of the ciphertext (known as the ciphertext header) from the storage device, and uses it in conjunction with a current key that was used to generate the ciphertext and a new key to compute an update token $\Delta$. This update token $\Delta$ is then communicated to the data storage device, which can use it to update the ciphertext to the new key without any further communication with the user.

Since encryption or decryption of the data is not performed by the data storage device, but rather by an application on the client, the data storage device never has access to the plaintext. This means that an adversary that is able to observe everything on the data storage device (even when it is in operation) learns nothing about the plaintext.

Figure 1:
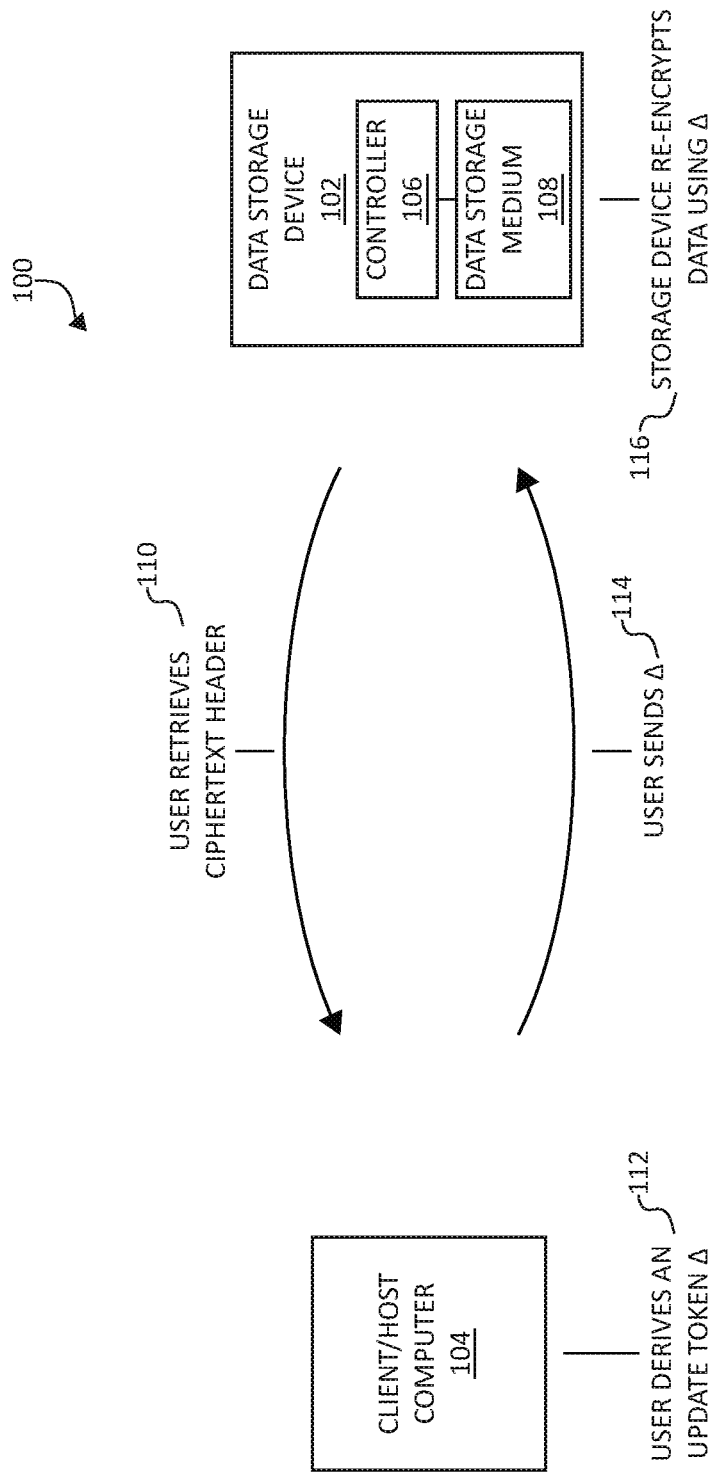
FIG. 1 is a diagrammatic illustration of updatable encryption in accordance with one embodiment.

FIG. 1 is a simplified block diagram illustrating a process 100 of key rotation carried out for encrypted data (ciphertext) stored in a data storage device in accordance with one embodiment. In FIG. 1, a data storage device 102 is communicatively coupled to a client or host computer 104. Communication between data storage device 102 and client computer 104 may take place via one or more wired and/or wireless communication protocols. In general, data storage device 102 may include a controller 106 and at least one memory/data storage medium 108 that is communicatively coupled to the controller 106 and that stores ciphertext. Non-limiting examples of data storage device 100 include a hard disk drive (HDD), which is an electromechanical device containing spinning discs and movable read/write heads, a solid state drive (SSD), which uses memory chips and contains no moving parts, and a hybrid drive, which combines features of HDDs and SSDs in one unit. Client or host computer 104 represents any type of computing system that is configured to read data from and write data to a data storage device. Examples of client or host computer 104 include cloud computing environments, servers, desktop computers, laptop computers, mobile phones, tablet computers, televisions, automobiles, or any other type of mobile or non-mobile computing device that is configured to read and write data.

In process 100, at 110, a user obtains a portion of the ciphertext stored in data storage device 102. This may involve the user sending, via the client computer 104, a ciphertext request command to data storage device 102. The ciphertext request command may request at least a portion of the ciphertext stored in data storage device 102. In response to receiving the ciphertext request command, controller 106 of data storage device 102 retrieves at least the portion of the ciphertext stored in memory/data storage medium 108 and provides the retrieved ciphertext to the client computer 104.

At 112, the user of the client computer 104, directs the client computer 104 to derive an update token $\Delta$ from the ciphertext received from the data storage device 102. Once derived, at 114, the update token Δ is sent by the user from the client computer 104 to the data storage device 102. Upon receiving the update token Δ, at 116, the controller 106 of the data storage device 102 re-encrypts existing ciphertext in memory/data storage medium 108 using the update token Δ to obtain re-encrypted ciphertext. The existing ciphertext in memory/data storage medium 108 may then be replaced with the re-encrypted ciphertext. As indicated above, when a process such as 100 is performed, an adversary that is able to observe everything on the data storage device 102 (even when it is in operation) learns nothing about the plaintext. Furthermore, this guarantee still holds even if the data storage device 102 is currently in the process of re-encrypting data using the update token Δ received from the client computer 104, as information about the current key or the new key cannot be derived from the update token Δ. In fact, the security may be even stronger. Suppose the user has performed key rotation t times, using the update tokens $\Delta_1$, $\Delta_2, \ldots, \Delta_t$, then, even if an adversary has all-but-one of the pieces of the following information:

1. the initial user key k,
2. the update token $\Delta_1$,
3. the update token $\Delta_2$,
4. . . . ,
5. the update token $\Delta_t$, the adversary will not be able to decrypt the newly re-encrypted data.

Benefits of a process such as 100 are as follows:
1. For reasons provided above, it provides strong security.
2. A small amount of ciphertext may be transferred from the data storage device to the client computer in order for the user to generate the update token Δ.
3. The data storage device can perform the re-encryption offline without any further communication with the client computer once it has the update token Δ.
4. It may be based on industry standard encryption such as advanced encryption standard (AES).
5. It may be based on a quantum-safe algorithm. For example, a solution based on AES is also quantum-safe provided the key size is doubled to protect against quantum search algorithms such as Grover's algorithm. Grover's algorithm allows searching over n objects in $O(\sqrt{n})$ steps, where O represents Big O notation in complexity theory. An adversary can use Grover's algorithm to search for the correct AES key. If, for example, a 128-bit AES is used, there are $2^{128}$ possible keys. However, by using Grover's algorithm, an adversary can find the correct key in approximately $\sqrt{2^{128}}=2^{64}$ steps. Hence, the 128-bit AES now provides just 64-bit security. To have 128-bit security, the key size may be doubled (e.g., a 256-bit key may be utilized).
6. It may be used to complement an existing solution in self-encrypting drives (SEDs). This may be carried out simply by including an additional layer of encryption on the already-encrypted data on an SED using an updatable encryption scheme. This will enable true key rotation while remaining compatible with trusted computing group (TCG) specifications.

Examples of devices employing process 100 are described below in connection with FIGS. 2 and 3.

Figure 2:
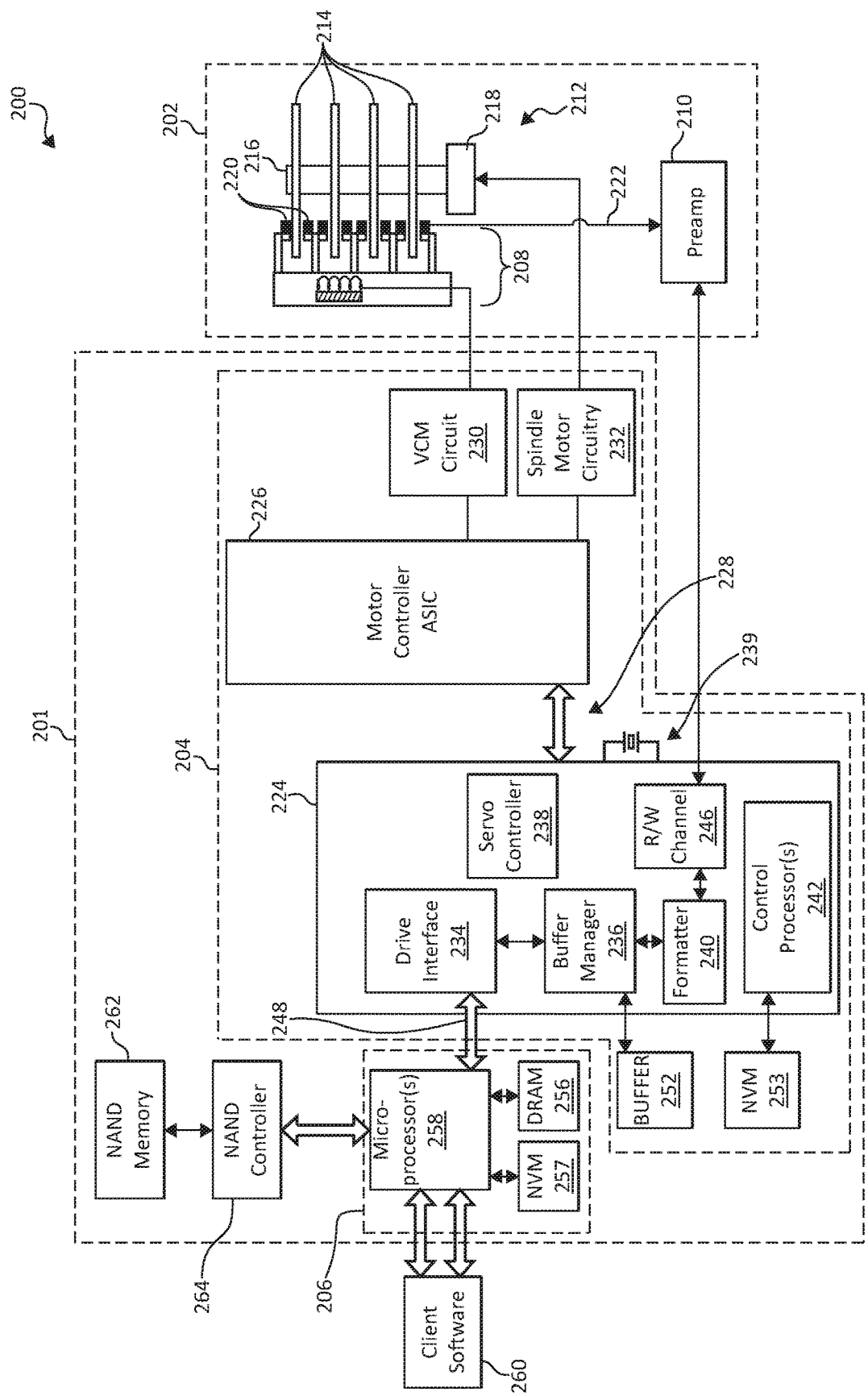
FIG. 2 is a diagrammatic illustration of a hard disc drive that carries out encryption key rotation in accordance with one embodiment.

FIG. 2 is a block diagram of an example HDD 200 that includes embedded encryption key-rotation circuitry in accordance with one embodiment. HDD 200 includes a logic board 201 and a head-disc assembly (HDA) 202. Logic board 201 includes a drive control circuit 204, which helps provide the HDD's basic storage operations, and embedded encryption key-rotation circuitry (sometimes generally referred to herein as a controller or control circuitry) 206, which enables key rotation to be carried out in HDD 200.

HDA 202 includes an actuator assembly 208, a preamplifier 210, and a disc assembly 212. Disc assembly 212 includes one or more media discs 214, stacked on a spindle assembly 216. Spindle assembly 216 is mechanically coupled to a spindle motor 218 for rotating the disc(s) 214 at a high rate of speed.

Actuator assembly 208 includes a voice coil motor (VCM), and multiple actuator arms. Located at the end of each actuator arm are one or more sliders/transducer heads such as 220, which are associated with a respective disc surface. Transducer heads 220 are coupled to preamplifier 210 via any suitable connection element 222.

In the embodiment of FIG. 2, drive control circuit 204 includes a HDD controller application specific integrated circuit (ASIC) 224 and a motor controller ASIC 226 that are coupled together via a connection element 228. VCM drive circuitry 230 and spindle motor drive circuitry 232 are coupled to motor controller ASIC 226.

HDD controller ASIC 224 includes a drive interface 234, a buffer manager 236, a servo controller 238, a formatter 240, control processors 242, and a read/write (R/W) channel 246. Drive interface 234 may be coupled to a bus connector (e.g., a SATA interface) 248 and communicates, via the bus connector 248, by receiving commands and data from and transmitting status and data back to, for example, embedded encryption key-rotation circuitry 206. Drive interface 234 may manage a queue of commands received from a host/client computer and/or encryption key-rotation circuitry 206. Drive interface 234 is connected to buffer manager 236 for transfer of commands, data, and status.

Buffer manager 236 controls a buffer memory 252, which may include volatile and/or nonvolatile electronic memory. Under the control of buffer manager 236, data from buffer memory 232 is provided to formatter 240, which provides the data in a suitable format to read/write channel 246, which communicates with HDA 202 to store the data on disc(s) 214. Also, data read from the disc(s) 214 is provided to formatter 240 via read/write channel 246.

In the embodiment of FIG. 2, control processor(s) 242 execute drive operational programs that may be stored in nonvolatile program storage memory 253, such as read-only memory (ROM) or Flash memory. In the interest of simplification, details regarding the drive operational programs are not provided.

Servo controller 238 provides intelligent control of actuator assembly 208 and spindle motor 218 through motor controller ASIC 226. By commands issued to motor controller ASIC 226 by servo controller 238, VCM driver circuitry 230 moves actuator assembly 208 and spindle motor drive circuitry 232 maintains a substantially constant spin rate of spindle motor 218. A crystal oscillator circuit 239 may be included in HDD 200 to provide a substantially stable clock signal for operating HDD 200.

During operation of HDD 200, transducer heads 222 communicate with drive control circuit 204 via preamplifier 210 for reading and writing data to the transducer head's associated disc surface. Preamplifier 210 provides an amplified signal to read/write channel 246 of drive control circuit 204. Read/write channel 246 performs encoding and decoding of data written to and read from the disc(s) 214.

HDD 200 is capable of carrying out encryption key rotation to provide additional security for encrypted data. In the embodiment shown in FIG. 2, such additional security within HDD 200 is provided by embedded encryption key-rotation circuitry 206. Embedded encryption key-rotation circuitry 206 includes memory (e.g., electronic memory) for storing firmware and software that includes instructions that support the rotation of encryption keys in HDD 200. Further, embedded encryption key-rotation circuitry 206 includes one or more processors that execute the instructions stored in the memory within embedded encryption key-rotation circuitry 206. In the embodiment of FIG. 2, embedded encryption key-rotation circuitry 206 includes volatile memory 256 (e.g., dynamic random access memory (DRAM)), which is coupled to a microprocessor 258. In a particular embodiment, microprocessor 258 is a dual-core microprocessor. However, in alternate embodiments, other processor core counts, such as single or four-core microprocessors 258, may be employed. A non-volatile memory (NVM) 257 may be included to store encryption instructions that are executable by microprocessor(s) 258. Microprocessors 258 may also include a cryptographic accelerator (not separately shown in FIG. 2), which in an embodiment is a co-processor having instructions to accelerate re-encryption of ciphertext headers and bodies. The cryptographic accelerator may carry out some of the cryptographic operations, e.g., AES.

In the embodiment shown in FIG. 2, embedded encryption key-rotation circuitry 206 is coupled to drive control circuit 204 via, for example, SATA interface 248. In an alternate embodiment, microprocessor(s) 258 may be incorporated within HDD controller ASIC 224. Such an embodiment eliminates SATA interface 248. As can be seen in FIG. 2, HDD 200 includes one or more interfaces 259 (e.g., Ethernet interfaces) to connect to external devices (e.g., a host or client computer). In some embodiments, the connection to the external devices takes place via a network. In alternate embodiment, HDD 200 may communicate wirelessly with external devices. Encryption software included in the client computer is denoted by reference numeral 260, and is used to carry out data encryption and to generate tokens in a manner described above in connection with FIG. 1.

In HDD 200, ciphertext headers and bodies may be stored separately. For example, ciphertext headers may be stored in a solid-state memory (e.g., in NAND memory 262, which may be operated by NAND controller 264 that is coupled to microprocessor 258). Ciphertext bodies may be stored on disc(s) 114.

When HDD 200 receives a read request from the client computer, microprocessor 258 retrieves a ciphertext header associated with the read request from solid-state memory 262 with the help of memory controller 264. Also, microprocessor 258 enlists the help of HDD controller ASIC 224 to obtain ciphertext body associated with the read request. The ciphertext header and body are then sent by HDD 200 to the client computer that employs encryption software 260 to decrypt the ciphertext received in response to the read request.

When the client computer carries out a write operation to HDD 200, the client computer first sends a request to the HDD 200 for a ciphertext header. The request is sent because, when new data is to be written to HDD 200, an existing ciphertext header may be used to encrypt the new data. If no ciphertext header exists in the HDD 200, HDD 200 responds by requesting the client computer to create a new ciphertext header and body. If a ciphertext header already exists in HDD 200, HDD 200 responds to the request by sending the client computer the ciphertext header. Encryption software 260 in the client computer utilizes information in the ciphertext header to encrypt the new data, and sends the resulting new ciphertext body to HDD 200 for storage. A signature or a message authentication code (MAC) may be appended to the ciphertext header by the client to ensure it originated from the client computer.

Re-encryption of existing ciphertext in the HDD 200 may be carried out in a manner described earlier in connection with FIG. 1. To re-encrypt data, microprocessor 258 retrieves a ciphertext header from NAND memory 262 with the help of NAND memory controller 264. Microprocessor 258 then sends the retrieved ciphertext header to the client computer. Encryption software 260 within the client computer generates an update token based on information in the ciphertext header. The client computer then sends the update token to HDD 200. Microprocessor 258 utilizes the update token to update both the ciphertext header in NAND memory 262 and the ciphertext body on data storage disc(s) 214.

In the embodiment of FIG. 2, ciphertext bodies and headers are stored separately so that it is possible for the HDD 200 to quickly read multiple ciphertext headers. This is useful during re-encryption, as multiple requests for update tokens can be sent by HDD 200 to the client computer in parallel. The update tokens received from the client computer are then stored in RAM (e.g., DRAM 256 or any other suitable memory by the HDD 200, which can slowly perform the re-encryption when the client computer is offline.

Ciphertext headers are stored in NAND memory such as 262 as NAND memory provides fast read speeds. The limited lifespan of NAND memory is not an issue as ciphertext headers are infrequently written (e.g., during the first encryption and during re-encryption).

Figure 3:
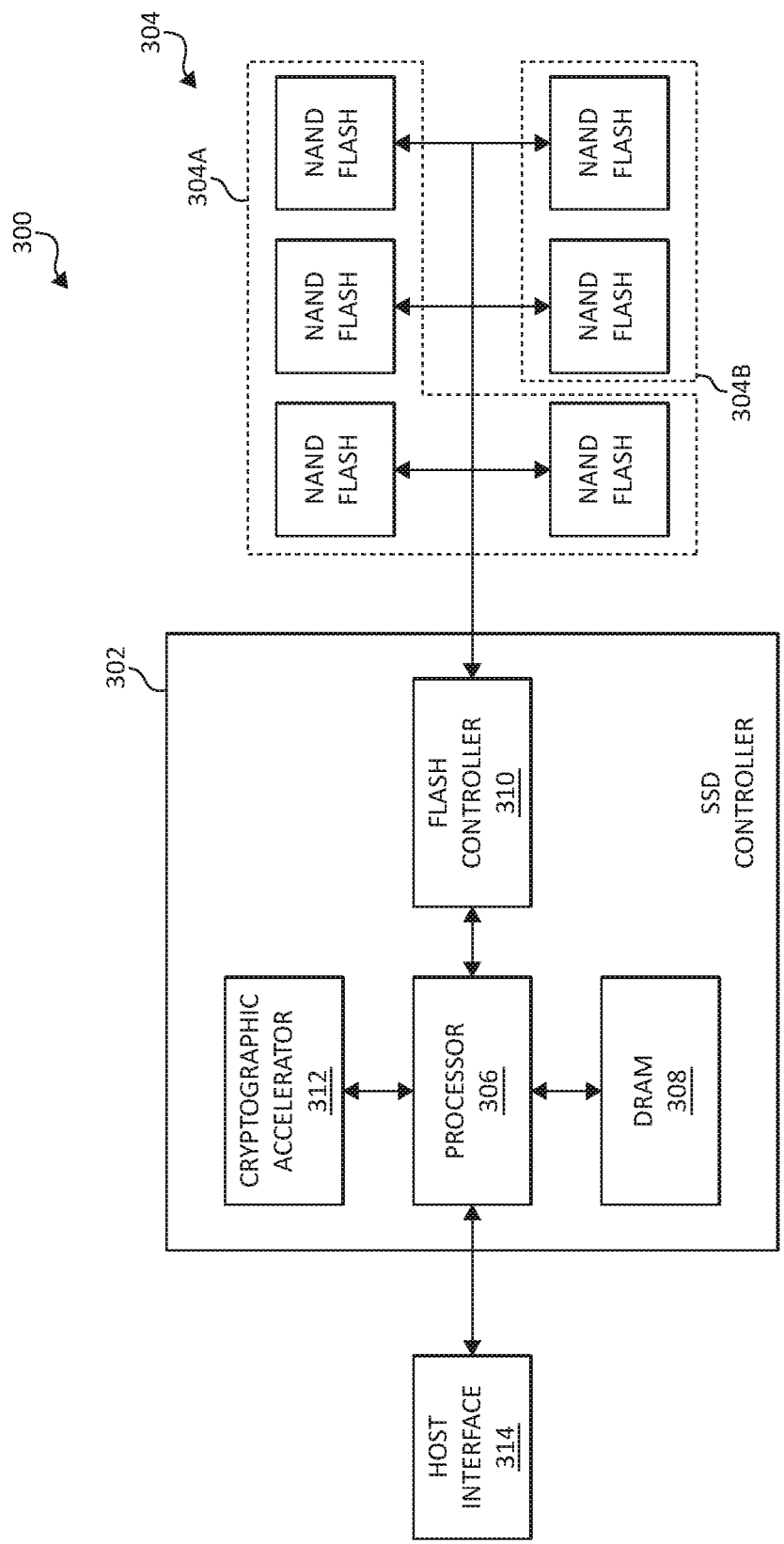
FIG. 3 is a diagrammatic illustration of a solid state drive that carries out encryption key rotation in accordance with one embodiment.

FIG. 3 is a simplified block diagram of an example SSD 300 that includes embedded encryption key-rotation circuitry in accordance with one embodiment. SSD 300 includes a drive-level controller 302 and a plurality of solid-state non-volatile memory devices (e.g., NAND Flash memory devices) 304. Of the plurality of non-volatile memory devices 304, a first memory subset 304A serves as the SSD's data storage media, and is utilized to store ciphertext bodies. A second memory subset 304B is reserved for storage of ciphertext headers. Drive-level controller 302 includes a processor 306, a solid-state volatile memory (e.g., a DRAM) 308, a solid-state non-volatile memory controller (e.g., a Flash memory controller) 310 and a cryptographic accelerator 312. Memory controller 310 is coupled to individual memories of the plurality of memories 304, and helps processor 306 selectively store/retrieve data (e.g., ciphertext headers and bodies) to/from different memories of the plurality of memories (e.g., 304A and/or 304B). Cryptographic accelerator 312 is in one embodiment a co-processor having instructions to accelerate re-encryption of ciphertext headers and bodies. Accordingly, the cryptographic accelerator 312 may carry out some of the cryptographic operations, e.g., AES. SSD 300 carries out cryptographic functions and sends/receives ciphertext/tokens to/from a client computer via host interface 314 in a manner substantially similar to that described in connection with FIG. 2, and therefore the description of the similar operations is not repeated in the interest of brevity.

In the embodiments described above in connection with FIGS. 1, 2 and 3, the updatable encryption operations are sometimes described as being carried out by specific types of processors/co-processors. However, in general, any suitable memory/tangible data storage medium in a data storage device may store updatable encryption instructions, which are computer-readable and that may be executed by a processor/controller to perform the functionality of the processor/controller.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

What is claimed is:

1. A method comprising:
    providing ciphertext comprising a ciphertext header and a ciphertext body;
    storing the ciphertext header in a first memory of a data storage device;
    storing the ciphertext body in a second memory of the data, storage device, the second memory having a slower access speed than the first memory and being of a different type than the first memory;
    receiving, in the data storage device, a request from a client computer for the ciphertext header;
    providing, by a controller of the data storage device, the ciphertext header to the client computer;
    receiving, in the data storage device, an update token generated by the client computer from the ciphertext header; and
    performing, by the controller of the data storage device, re-encryption of the ciphertext using the update token.

2. The method of claim 1 and further comprising storing the update token in a third memory that is a different type of memory than the first memory and the second memory.

3. The method of claim 1 and wherein the performing, by the controller of the data storage device, re-encryption of the ciphertext using the update token comprises re-encrypting the ciphertext header and the ciphertext body.

4. The method of claim 1 and further comprising, in response to providing the client computer with the ciphertext header, receiving new ciphertext encrypted with information in the ciphertext header.

5. The method of claim 1 and wherein the ciphertext comprises a plurality of ciphertext headers and a plurality ciphertext bodies, and wherein the plurality of ciphertext headers is provided to the client computer.

6. The method of claim 1 and wherein the performing, by the controller of the data storage device, the re-encryption of the ciphertext using the update token is carried out when the client computer is offline.

7. A data storage device comprising:
    at least one memory;
    a controller communicatively coupled to the at least one memory, the controller configured to carry out encryption-related operations when new data is to be written in the data storage device, the encryption-related operations comprising:
        determining whether a previously-generated ciphertext header is stored in the at least one memory;
        in response to determining that the previously-generated ciphertext header is stored in the at least one memory, sending the previously-generated ciphertext header to a client computer for utilization in encryption of the new data; and
        in response to determining that no previously-generated ciphertext header is stored in the at least one memory, requesting the client computer to generate a new ciphertext header and a new ciphertext body for the new data.

8. The data storage device of claim 7 and wherein the controller is further configured to:
    receive the new ciphertext header and the new ciphertext body from the client computer; and
    store the new ciphertext header and the new ciphertext body in the at least one memory.

9. The data storage device of claim 8 and wherein the at least one memory comprises a plurality of memories, and wherein the controller is further configured to:
    store the new ciphertext header in a first memory of the plurality of memories; and
    store the new ciphertext body in a second memory of the plurality of memories, the second memory having a slower access speed than the first memory.

10. The data storage device of claim 9 and wherein the controller is further configured to carry out re-encryption operations, the re-encryption operations comprising:
    receiving a request from the client computer for any stored ciphertext header;
    providing the stored previously-generated ciphertext header or the stored new ciphertext header to the client computer;
    receiving an update token generated by the client computer from the provided previously-generated ciphertext header or the provided new ciphertext header; and
    performing re-encryption of the stored previously-generated ciphertext header or the stored new ciphertext header and the stored new ciphertext body using the update token.

11. The data storage device of claim 10 and wherein the controller is further configured to store the update token in a third memory of the plurality of memories, the third memory being a different type of memory than the first memory and the second memory.

12. A computer-readable hardware memory or hardware disc storing executable instructions that, when executed by a processor, cause the processor to:
- store a ciphertext header in a first memory of a data storage device;
- store a ciphertext body in a second memory of the data storage device, the second memory having a slower access speed than the first memory and being of a different type than the first memory;
- receive a request from a client computer for the ciphertext header;
- provide the ciphertext header to the client computer;
- receive an update token generated by the client computer from the portion of the ciphertext;
- re-encrypt at least one of the ciphertext or the ciphertext body using the update token.

13. The computer-readable hardware memory or hardware disc of claim 12 and wherein the re-encryption using the update token comprises re-encryption of the ciphertext header and the ciphertext body.

14. The computer-readable hardware memory or hardware disc of claim 12 and wherein the executable instructions further cause the processor to store the update token in a third memory that is a different type of memory than the first memory and the second memory.

* * * * *